A. PENN.
INSECT COLLECTING AND DESTROYING MACHINE.
APPLICATION FILED DEC. 22, 1916.
1,238,188.
Patented Aug. 28, 1917.
2 SHEETS—SHEET 1.
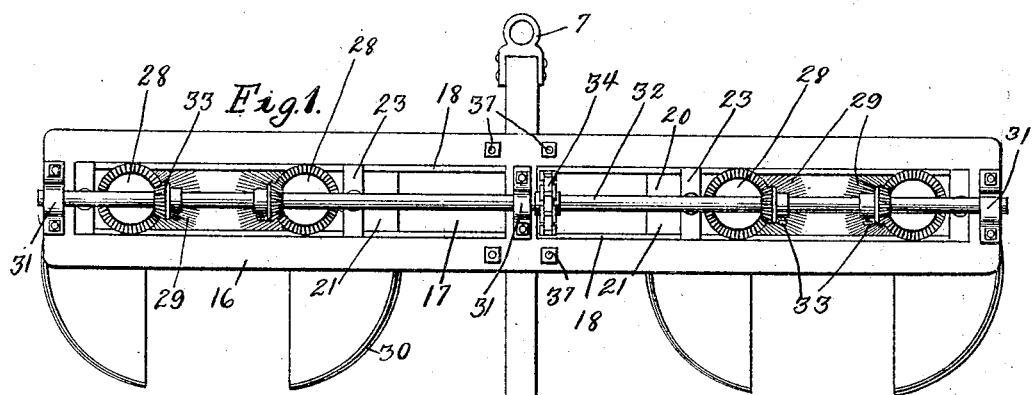
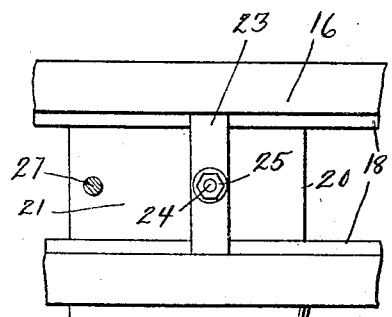
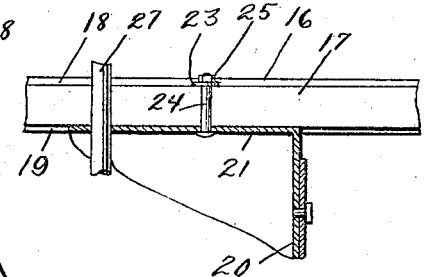
WITNESSES
Arthur K Moore
D.K.Galt
INVENTOR
Alfred Penn
BY Richard B Owen
ATTORNEY A. PENN.
INSECT COLLECTING AND DESTROYING MACHINE.
APPLICATION FILED DEC. 22, 1916.

1,238,188.

Patented Aug. 28, 1917.
2 SHEETS—SHEET 2.

INVENTOR
Alfred Penn

WITNESSES

BY

ATTORNEY

UNITED STATES PATENT OFFICE.

ALFRED PENN, OF NEW ORLEANS, LOUISIANA.

INSECT COLLECTING AND DESTROYING MACHINE.

1,238,188.  Specification of Letters Patent.  Patented Aug. 28, 1917.

Application filed December 22, 1916. Serial No. 138,421.

*To all whom it may concern:*

Be it known that I, ALFRED PENN, a citizen of the United States, residing at New Orleans, in the parish of Orleans and State of Louisiana, have invented certain new and useful Improvements in Insect Collecting and Destroying Machines, of which the following is a specification.

This invention relates to insect collecting and destroying mechanisms, and aims primarily to simplify and increase the efficiency generally of devices of this character.

A further object is to provide a machine adapted particularly for use in removing the boll weevil from cotton plants, and which has its removing mediums so constructed and operated as to offer the least possibility of injury to the plants with which it is used. A further object is to provide a device of this character which has its insect removing mechanisms so arranged as to be capable of being adjusted relative to each other, so as to compensate for varying distances between the rows of growing plants. A further object is to provide a device of this character which includes means for removing the insects from plants and a receptacle for holding oil or insecticide, and the insect removing means is hinged in such manner as to deliver the insects into the receptacle.

A still further object is to provide an attachment for plows or cultivators, which is capable of being readily applied to and removed from the beam of the farming implement, and which includes agitators and means for operating the agitators, the agitators being so arranged as to deposit the insects shaken from the plant into the path of travel of the plow or cultivator blades; and which is of light weight and extremely simple construction, and which will prove thoroughly efficient in the performance of the functions for which it is designed.

With these objects in view, together with others which will appear as the description proceeds, the invention resides in the novel formation, combination, and arrangement of parts, all as will be described more fully hereinafter, illustrated in the drawings, and particularly pointed out in the claims.

In the drawings:—

Figure 1 is a top plan view of a conventional form of plow or cultivator, and illustrating the application of an insect destroyer constructed in accordance with the invention;

Fig. 4 is an enlarged sectional view taken substantially upon line 4—4 of Fig. 2; and Fig. 5 is a detail view illustrating the manner of attaching the brush supporting brackets to the supporting bar.

Figure 2:
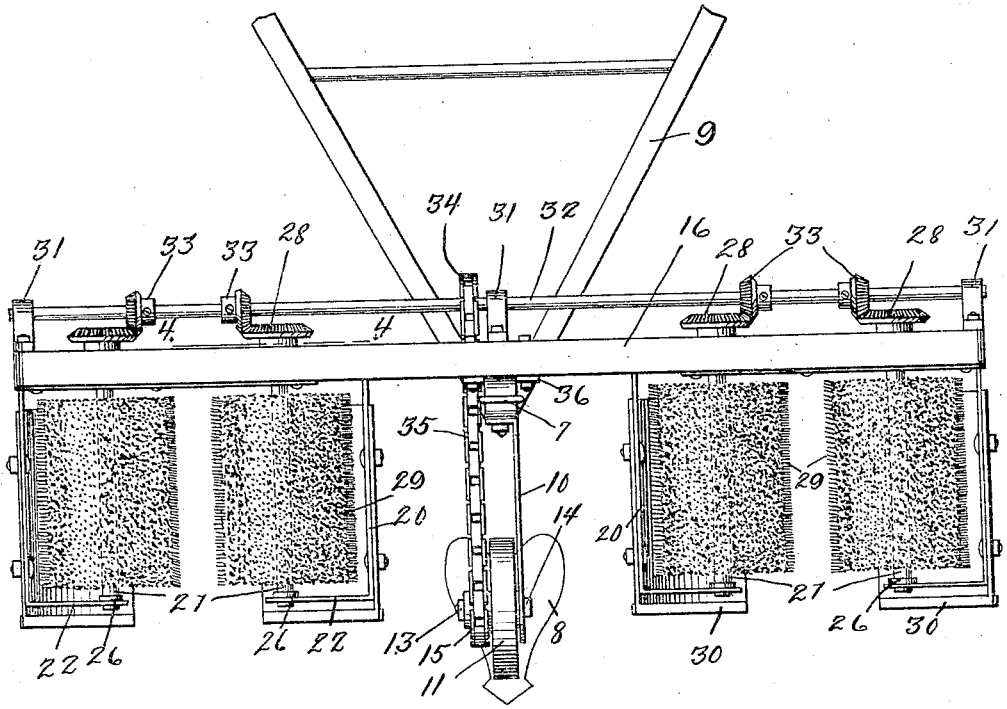
Fig. 2 is a front elevation of the device shown in Fig. 1.
Figure 3:
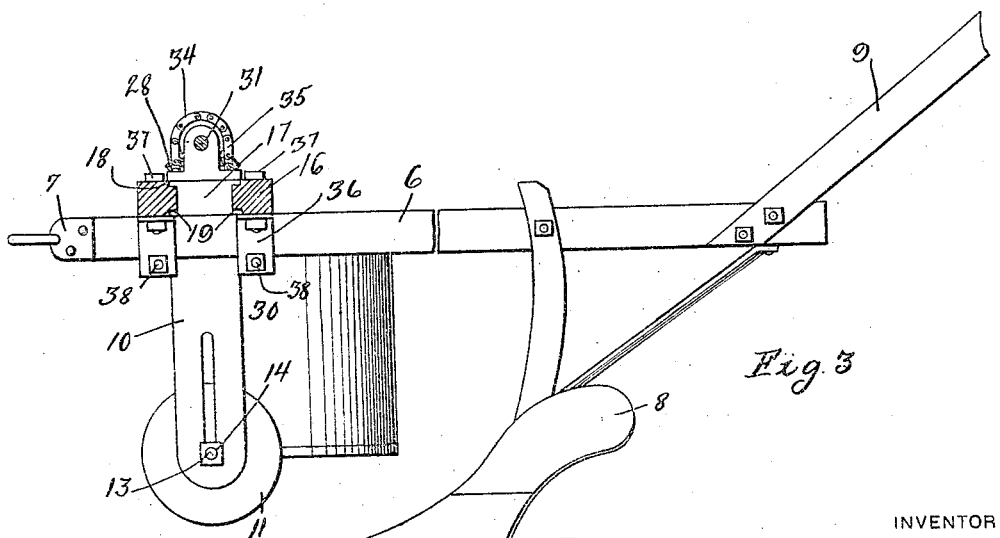
Fig. 3 is a side elevation, partly in section, of the improved mechanism.

In carrying out the invention, a bar or support is detachably secured to the beam of a plow, cultivator or other like implement, and projects beyond the longitudinal edges thereof. Rotatably mounted upon this bar and capable of being adjusted longitudinally thereof are agitators in the form of brushes, which are adapted to engage the growing plants as the implement advances, to remove insects therefrom. A power wheel is detachably connected to the plow beam to assist in supporting the load thereon, and from which the necessary power is developed to operate the agitators. Each of the agitators is partially inclosed by a deflector or hood, and beneath each brush is a pan adapted to contain oil or insecticide, the said hoods and pans being so arranged as to receive and retain insects delivered thereto by the agitators. The agitators are also so disposed as to brush the insects from the plants so that in the event of their not being deposited within the hoods or pans, they will lie in the path to be traversed by the plowing or cultivating blade, so as to be covered by the soil turned thereby.

Referring now particularly to the drawings, 6 indicates the beam of a conventional form of plow or cultivator, having the usual clevis 7 at one end for the attachment of draft animals, carries adjacent its rear end a plow 8, and which is controlled in its movements through the handles 9. The invention is not necessarily restricted to use with my particular form or type of plow or cultivator.

Detachably secured in any preferred manner adjacent the forward end of the beam 8 and depending therefrom is a bracket 10, which supports a vertically adjustable ground engaging or power wheel 11. This wheel may be made adjustable vertically so as to permit of the forward end of the beam being supported at various distances above the ground. In the present instance, the bracket 10 is equipped with a vertically disposed slot 12, through which one end of the supporting shaft 13 for the wheel 11 extends. Lock nuts 14 may be threaded upon the extremity of the shaft 13, so as to bind the said shaft to the bracket to hold the shaft in its various positions of adjustment. This wheel 13 has secured thereto a sprocket indicated at 15.

The support for the agitators or brushes and hoods and pans comprises a bar 16. This bar may be formed of any preferred material, and is preferably constructed of light metal. The bar is equipped with a central longitudinal slot 17, the parallel longitudinal walls of which are cut away adjacent the upper and lower faces of the bar to provide shallow grooves 18 and 19, respectively. The means for supporting the agitators comprises brackets 20, formed of light strap metal providing relatively long straight portions from the ends of which upper and lower parallel arms 21 and 22 project. The width of the upper arms 21 is such as to engage snugly at their opposite longitudinal edges within the grooves 19 in the opposing walls of the slot 17, so that the bracket may slide longitudinally of the bar and yet are prevented from oscillating or moving laterally thereof. Associated with each bracket is a plate 23, the said plates resting at their ends within the grooves 18 in the upper surface of the bar 16. A bolt 24 extends downwardly through each plate 24 and through a suitable aperture in the upper arm 21 lying thereunder, and it is obvious that by tightening the nut 25 on each bolt, the plate 23 and arm 21 will be bound securely to the bar 16, and will be incapable of moving thereon. This construction provides a simple and yet efficient means for locking the bracket rigidly to the bar, and yet in such manner that adjustment of the brackets longitudinally of the support 16 may be readily made when required.

A socket 26 is arranged upon the upper surface of each of the lower arms 22 of the brackets 20 and near the outermost end thereof. Rotatably mounted in each socket is the lower end of a brush shaft 27, the said shafts being disposed vertically. These shafts extend loosely through suitable openings in the upper arms 21, and carry beveled gears 28 at their upper extremities. The shafts are of such length that the beveled gears are disposed a slight distance above the upper surface of the support or bar 16. Each shaft carries a brush having relatively long flexible bristles.

Associated with each brush is a hood or deflector 30. These deflectors are formed of thin sheet metal, and are secured by bolts or rivets to the straight or vertical portions of the brackets 20. The hoods extend rearwardly beyond the brushes and curve so that their rear edges are disposed in substantially the same plane with their respective brush shafts, in the direction of travel of the machine. The hoods are of substantially the same length as the brushes, so as to insure the collection of all insets brushed from the plants.

The bottom of each hood forms a pan, indicated at 30, and within which oil or suitable insecticide is placed, and as the insects falls within this receptacle, they will obviously be killed by the fluid within the pan.

Mounted at its ends in suitable bearings 31 at the extremities of the bar 16 and at the ends thereof is a driven member or shaft 32. This shaft has adjustably secured thereon beveled pinions 33, the latter being adapted to intermesh with the gears 28 of the various brush shafts. A sprocket 34 is also affixed to the shaft 32, and a sprocket chain 35 passes over the said sprocket wheel and also the sprocket 15 secured to the ground wheel 11.

From the foregoing, it is obvious that forward movement of the plow or cultivator will create, through the sprockets 15—34, and chain 35, rotary movement in the shaft 32, and this movement, by reason of the gears 33—38 develops rotation in the brush shafts. It will be observed that the gears are so arranged that the brushes will operate to brush in a direction opposite to the direction of travel of the implement. It is also to be observed that the brushes are arranged in pairs, those of each pair being adapted to engage upon the opposite sides of growing plants, and in the present instance there are but two pairs of brushes employed. The space between the brushes of each pair is sufficient to permit of passing the plants of the row without danger of breaking or injuring the same; however, the bristles of the brushes will contact the plants with sufficient force to thoroughly agitate the same and to brush off bugs and other insects. As the implement advances, the insects are brushed rearwardly, and come into contact with the rearwardly extending portions of the deflectors. The insects then drop into the pans 30 and are killed by the liquid therein. Should any of the insects fail to be collected within the receptacles 30, the same will drop to the ground, and the following plow or cultivator will cover them with a furrow. In this manner it is obvious that all insects removed from the plants by the brushes will be exterminated.

Should it be required to adjust the various pairs of brushes to compensate for rows of plants planted at a greater or less distance apart, the bolts 24 may be loosened and the binding action between the arms 21 and plates 23 will be relieved. The brackets 20 may be then moved to the desired position, whereupon tightening of the nuts 25 upon the bolts will again maintain the brackets and their dependent parts against movement. The set screws which bind the beveled pinions 33 to the shaft 32 may be loosened and the pinions adjusted to their respective gears 28. It will be observed also, that the pinions 33 hold the shafts in proper position within the supporting brackets 26.

The bug destroying mechanism in the present instance is shown as an attachment for the ordinary plow or cultivator, and any suitable means for attaching the cross beam or bar 16 to the plow or cultivator beam may be employed. Preferably, a casting is provided to effect the connection between the bar 16 and the plow beam; however, angle plates 36 may be used. Bolts 37 extend through the bar 16 to secure the upper extension of the plates thereto, and bolts 38 may connect the pendent portions of the plates beneath the beam 6 of the implement. In this manner, the bar 16 is rigidly supported upon the plow beam, and movement of the said bar either longitudinally or laterally of the plow beam is obviated.

While the present disclosure is that of what I believe to be the preferred embodiment of the invention, it is to be understood that the invention is not limited thereto, but that various changes may be made in the construction, arrangement, and proportion of parts, without departing from the spirit of the invention, as defined in the appended claims.

What is claimed is:—

1. In a device of the class described, a bar having a longitudinal slot, the walls of said slot being cut away at their upper and lower ends to provide grooves, a bracket, an arm projecting from said bracket and engaging in the lower of said grooves, a plate resting in the upper of said grooves, a bolt connecting said plate and arm, a brush mounted in said bracket, and means for rotating said brush.

2. In a device of the class described, a bar, a bracket mounted for adjustment longitudinally of said bar, arms on said bracket, a socket carried by one of said arms, the opposite arm being provided with an opening alined with said socket, a shaft mounted for rotating at one end in said socket and extending through said opening, a brush on said shaft, and means for rotating said shaft.

3. In a device of the class described, a bar, a bracket carried by said bar, a brush rotatably mounted in said bracket, a hood carried by said bracket and partially inclosing said brush, and a receptacle carried by the bracket at the bottom of said hood and extending beneath said brush.

4. In a device of the class described, a bar, a bracket carried by said bar, a brush rotatably mounted in said bracket, a deflector secured to said bracket and extending rearwardly from said brush, the rear edge of said deflector being in substantially the same vertical plane with the central portion of said brush, and a pan beneath said brush.

5. In a device of the class described, a pair of brackets, brushes rotatably mounted in said brackets, a hood on each bracket, the said hoods partially inclosing their respective brushes and having their open ends disposed toward each other, and means for rotating said brushes.

In testimony whereof I affix my signature in presence of two witnesses.

ALFRED PENN.

Witnesses:
F. EISLER,
WILLIAM A. DIXON.

Copies of this patent may be obtained for five cents each, by addressing the "Commissioner of Patents, Washington, D. C."